US010865850B2

(12) United States Patent
Pitsch et al.

(10) Patent No.: US 10,865,850 B2
(45) Date of Patent: Dec. 15, 2020

(54) ADJUSTMENT WHEEL ARRANGEMENT FOR A SHOCK ABSORBER, AND SHOCK ABSORBER WITH SUCH AN ADJUSTMENT WHEEL ARRANGEMENT

(71) Applicants: ThyssenKrupp Bilstein GmbH, Ennepetal (DE); thyssenkrupp AG, Essen (DE)

(72) Inventors: Daniel Pitsch, Cologne (DE); Martin Flick, Gummersbach (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 151 days.

(21) Appl. No.: 16/124,997

(22) Filed: Sep. 7, 2018

(65) Prior Publication Data

US 2019/0078641 A1    Mar. 14, 2019

(30) Foreign Application Priority Data

Sep. 8, 2017   (DE) .................. 10 2017 120 751

(51) Int. Cl.
*F16B 21/02*    (2006.01)
*F16F 9/56*    (2006.01)
(Continued)

(52) U.S. Cl.
CPC .................. *F16F 9/56* (2013.01); *F16B 3/00* (2013.01); *F16B 7/042* (2013.01); *F16F 9/443* (2013.01); *F16F 9/467* (2013.01)

(58) Field of Classification Search
CPC ... F16F 9/56; F16F 9/443; F16F 1/121; B62K 2025/048; F16D 1/112; Y10T 403/7005; Y10T 403/7007; Y10T 74/2084
(Continued)

(56) References Cited

U.S. PATENT DOCUMENTS 3,182,770 A * 5/1965 Shemet ................... F16B 21/02
                                                    403/408.1
3,218,879 A * 11/1965 Reed ....................... B62M 25/00
                                                    74/489
(Continued)

FOREIGN PATENT DOCUMENTS

CN        101063461 A    10/2007
CN        203906647 U    10/2014
(Continued)

*Primary Examiner* — Bradley T King
*Assistant Examiner* — Stephen M Bowes
(74) *Attorney, Agent, or Firm* — thyssenkrupp North America, LLC

(57) ABSTRACT

An adjustment wheel arrangement for a shock absorber with a first adjustment wheel which is configured to connect in a torque-proof fashion to an adjustment tube of a piston rod of the shock absorber, and a second adjustment wheel which is configured to connect in a torque-proof fashion to an adjustment rod extending through the adjustment tube. The first adjustment wheel and the second adjustment wheel can be twisted relative to each other by means of a push-twist connection but are or can be connected by form-fit to each other in the axial direction. The push-twist connection is configured in the manner of a key-lock, such that the first adjustment wheel and the second adjustment wheel can be connected to or separated from each other only in a single relative orientation.

12 Claims, 1 Drawing Sheet

(51) Int. Cl.
  *F16B 3/00* (2006.01)
  *F16B 7/04* (2006.01)
  *F16F 9/44* (2006.01)
  *F16F 9/46* (2006.01)
(58) Field of Classification Search
  USPC .................................. 74/527, 528, 529, 553
  See application file for complete search history.

(56) References Cited

U.S. PATENT DOCUMENTS

| | | | | |
|---|---|---|---|---|
| 3,443,783 A | * | 5/1969 | Fisher | F16B 19/00 248/239 |
| 3,776,649 A | * | 12/1973 | Kemezys | F16B 21/04 403/90 |
| 4,744,265 A | * | 5/1988 | Nagano | B62M 25/04 74/473.13 |
| 5,584,098 A | * | 12/1996 | Koyama | B60H 1/0065 16/441 |
| 5,862,715 A | * | 1/1999 | Lemire | H01H 19/11 74/527 |
| 6,322,284 B1 | * | 11/2001 | Bonardo | B60K 23/02 403/348 |
| 6,802,407 B1 | * | 10/2004 | Chen | B62K 25/08 188/282.8 |
| 2007/0074939 A1 | | 4/2007 | Chen | |
| 2008/0116622 A1 | * | 5/2008 | Fox | B62K 25/08 267/64.28 |

FOREIGN PATENT DOCUMENTS

| | | |
|---|---|---|
| DE | 33 26 275 A | 2/1984 |
| DE | 19 856 100 A | 7/2000 |
| DE | 103 19 390 B | 11/2004 |
| DE | 10 2009 022 361 A | 12/2009 |
| JP | S 57186647 A | 11/1982 |

* cited by examiner

ADJUSTMENT WHEEL ARRANGEMENT FOR A SHOCK ABSORBER, AND SHOCK ABSORBER WITH SUCH AN ADJUSTMENT WHEEL ARRANGEMENT

CROSS-REFERENCE TO RELATED APPLICATION

Priority is claimed to German Patent Application No. DE 10 2017 120 751.1, filed on Sep. 8, 2017, the entire contents of which is hereby incorporated by reference herein.

FIELD

The present disclosure generally relates to an adjustment wheel arrangement for a shock absorber.

BACKGROUND

An adjustment wheel arrangement of the type cited initially is known for example from DE 103 19 390 B4, which describes a hydraulic shock absorber having an adjustment wheel arrangement which serves to adjust the damper characteristics of the shock absorber. The shock absorber has a piston which is guided inside a cylinder and is connected to a piston rod. The piston rod has an adjustment tube which is connected to a first adjustment wheel. A second adjustment wheel is connected in a torque-proof fashion to an adjustment rod guided inside the adjustment tube. By twisting the adjustment wheels relative to each other, passage openings inside the piston rod can be changed so that the through-flow of a hydraulic working medium can be controlled. In this way, the damper characteristics can be adjusted.

In general, various requirements apply to the adjustment functions of shock absorbers. Firstly, it must be possible to adjust the adjustment tube or an adjustment shaft by means of the adjustment wheel arrangement. At the same time, the adjustment wheels must be fixed to each other, wherein simultaneously a relative twist must be possible between the two adjustment wheels. In addition, it is desirable to establish an acoustic feedback for the adjustment position selected. In previous adjustment wheel arrangements, these individual functions were fulfilled by separate technical solutions.

In addition, there is generally a need to achieve as compact a construction of the adjustment wheel arrangement as possible, while retaining ease of handling.

Thus a need exists to refine the former adjustment wheel arrangement such that as many functions as possible are combined in a small space, giving a compact construction. A need also exists to specify a shock absorber with such an adjustment wheel arrangement.

DETAILED DESCRIPTION

Figure 1:
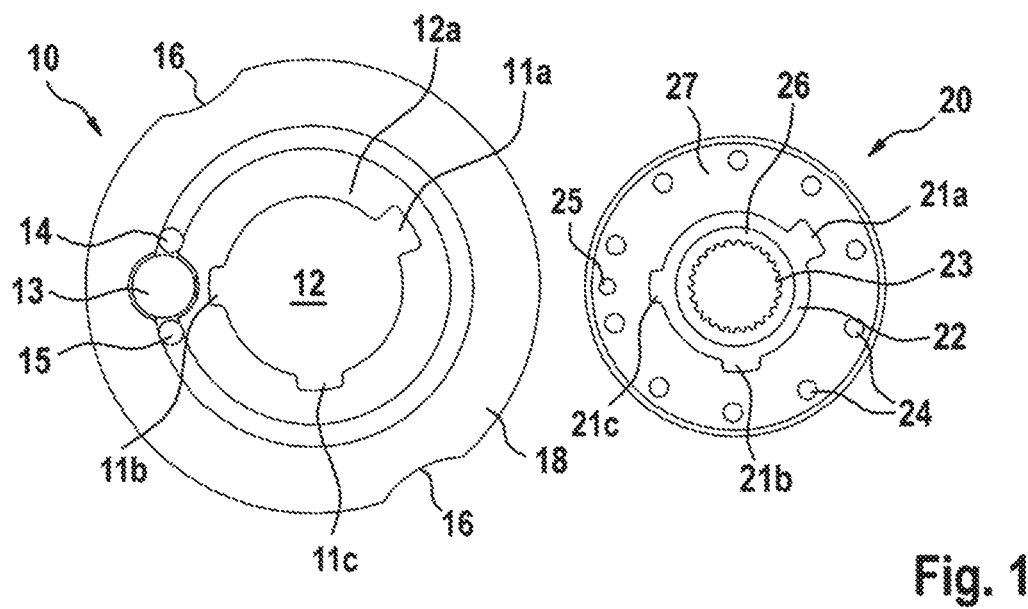
FIG. 1 is a top view of an adjustment wheel arrangement in the dismantled state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention concerns an adjustment wheel arrangement for a shock absorber. The invention furthermore concerns a shock absorber with such an adjustment wheel arrangement.

The invention is based on the concept of specifying an adjustment wheel arrangement for a shock absorber with a first adjustment wheel which is or can be connected in a torque-proof fashion to an adjustment tube of a piston rod of the shock absorber. Furthermore, the adjustment wheel arrangement comprises a second adjustment wheel which is or can be connected in a torque-proof fashion to an adjustment rod extending through the adjustment tube. According to the invention, the first adjustment wheel and the second adjustment wheel can be twisted relative to each other by means of a push-twist connection, but are or can be connected by form-fit to each other in the axial direction. Here, the push-twist connection is configured in the manner of a key-lock principle, such that the first adjustment wheel and the second adjustment wheel can be connected to or separated from each other only in a single relative orientation.

This push-twist connection offers several advantages. In this way, it is possible to structure the adjustment wheel arrangement so as to be particularly compact. The push-twist connection allows the adjustment wheels to intermesh at least in portions, which achieves a reduction in the installation size at least in the axial direction. The push-twist connection thus combines two functions, namely firstly the twist function and secondly a holding function, at least in the axial direction. As a whole, this gives a simple construction which in turn leads to simpler installation. Another positive effect of the invention is that the push-twist connection means that the connecting components are not visible to the end user. The push-twist connection is rather concealed, so that an attractive external appearance of the adjustment wheel arrangement is achieved.

The design of the push-twist connection on the key-lock principle achieves a particular security for installation, since incorrect installation is avoided. To this extent, the push-twist connection constitutes a poka-yoke mechanism. At the same time, it avoids any accidental release of the connection between the adjustment wheels when the adjustment wheels are twisted relative to each other. Separation of the two adjustment wheels is in fact possible only in a single orientation of the adjustment wheels relative to each other.

In a preferred embodiment of the invention, the push-twist connection has at least two recesses of different sizes on the first adjustment wheel, and two protrusions of different complementary sizes on the second adjustment wheel, which protrusions can extend through the recesses in order to connect the adjustment wheels. In other words, the protrusions provided on the second adjustment wheel are configured so as to be complementary to the recesses on the first adjustment wheel. Since the recesses and their complementary protrusions are formed with different sizes, a connection or separation of the adjustment wheels is possible only in a single orientation relative to each other. In the connected state, the protrusions can engage behind a portion of the first adjustment wheel in which the recesses are arranged. In this way, the adjustment wheels are axially secured relative to each other.

In particular, the recesses and the protrusions may be arranged on a common circular path, wherein the spacings of the recesses of the first adjustment wheel and the protrusions of the second adjustment wheel along the circular path are different from each other. The recesses on the first adjustment wheel are therefore not only of different sizes, but may also be spaced differently from each other. The protrusions of the second adjustment wheel are formed so as to be complementary thereto, wherein this applies also to the mutual spacings of the protrusions along the circular path. Thus the key-lock principle of the push-twist connection is continued. In the connected state of the two adjustment wheels, the recesses of the first adjustment wheel and the protrusions of the second adjustment wheel are only congruent, so that the adjustment wheels can be separated from each other, in a single position.

The first adjustment wheel preferably has a passage opening which comprises the recesses. In this way, the push-twist connection can be integrated particularly easily into the adjustment wheel arrangement. This applies in particular if, as is preferably provided, the second adjustment wheel has a cylindrical fixing portion which extends through the passage opening of the first adjustment wheel. Here, the protrusions of the second adjustment wheel may be formed on the cylindrical fixing portion. The cylindrical fixing portion, which extends through the passage opening of the first adjustment wheel, to this extent causes an intermeshing of the adjustment wheels. Thus, in at least the axial direction, the installation size of the entire adjustment wheel arrangement is further reduced. At the same time, the mechanical strength of the second adjustment wheel is maintained. To this extent, the cylindrical fixing portion preferably has a sufficient length to allow a good connection with an adjustment rod of a shock absorber.

Because the cylindrical fixing portion on which the protrusions are formed passes through the passage opening, it is also achieved that the protrusions can engage behind an inner flange delimiting the passage opening, and thus ensure the axial fixing of the adjustment wheels relative to each other.

To achieve as firm a connection as possible between the second adjustment wheel and an adjustment rod of a shock absorber, it is preferably provided that the second adjustment wheel, in particular the cylindrical fixing portion, has an internal toothing for force-fit and/or form-fit connection to the adjustment rod. The second adjustment wheel, in particular the cylindrical fixing portion, may be press-fitted to the adjustment rod. Here, the internal toothing of the second adjustment wheel presses into the adjustment rod, so that as well as a force-fit connection, a form-fit connection can also be created. Alternatively, it may be provided that the adjustment rod has a complementary outer toothing in which the internal toothing of the second adjustment wheel engages.

Also, a spring-loaded ball may be inserted in the first adjustment wheel and cooperate with several latching depressions in the second adjustment wheel to produce a rotational adjustment click. Production of the rotational adjustment click is advantageous since this gives a user feedback about which damper setting has been made. To achieve this, the spring-loaded ball of the first adjustment wheel may engage in latching depressions of the second adjustment wheel, so that a specific rotary position of the adjustment wheels relative to each other can be set audibly. The latching depressions are preferably arranged at regular intervals in a circle form about the cylindrical fixing portion.

The second adjustment wheel may also have an alignment pin receiver which is arranged on a common circular path with the latching depressions. Preferably, the alignment pin receiver is arranged between two latching depressions.

In a preferred embodiment of the invention, the alignment pin receiver is positioned such that the alignment pin receiver aligns with the spring-loaded ball when the first adjustment wheel and the second adjustment wheel have a relative position to each other, in which the recesses and protrusions of the push-twist connection are arranged above each other so as to be congruent. In other words, the connection between the adjustment wheels in the axial direction can be separated only when the alignment pin receiver is arranged aligned with the spring-loaded ball. In this way, a trained user can easily dismantle the adjustment wheel arrangement. For untrained users, this position is difficult to detect because the alignment pin receiver overlaps the spring-loaded ball, so unintentional dismantling of the adjustment wheel arrangement is unlikely.

Preferably, an alignment pin is inserted in the alignment pin receiver. The alignment pin in particular protrudes beyond the latching depressions. The alignment pin may be inserted in the alignment pin receiver only when the alignment pin receiver does not align with the spring-loaded ball. Otherwise, the spring-loaded ball would prevent a complete insertion of the alignment pin. It is evident from this that insertion of an alignment pin which extends beyond the latching depressions forms a stop. The two adjustment wheels can then be twisted relative to each other only until the alignment pin meets the spring-loaded ball laterally. To this extent, dismantling by untrained personnel is efficiently avoided at low cost. The stop formed by means of the alignment pin preferably allows a relative twist between the two adjustment wheels over an angle range of 330°.

A further preferred refinement of the invention provides that, for visual inspection of the relative position between the adjustment wheels, the second adjustment wheel has two passage openings, between which the spring-loaded ball is inserted. Here, said passage openings align with the alignment pin receiver in two predefined twist positions. For a trained user, the passage openings in the second adjustment wheel offer a reference point for determining whether the relative position between the adjustment wheels necessary for dismantling has been reached. In particular, after removal of the alignment pin, by means of the passage openings it can be detected whether these align with the alignment pin receiver. If this is the case, a further small twist of the adjustment wheels relative to each other is sufficient to bring the alignment pin receiver into a position aligned with the spring-loaded ball. In this position, then the first adjustment wheel and the second adjustment wheel can be separated from each other.

A second aspect of the invention concerns a shock absorber with an adjustment wheel arrangement as described above. The shock absorber is preferably formed as a hydraulic shock absorber.

The adjustment wheel arrangement shown in the attached drawings serves preferably for manual adjustment of damping properties of a hydraulic shock absorber. For this, two adjustment wheels 10, 20 are provided, wherein the first adjustment wheel 10 can be connected to an adjustment tube of a piston rod of the shock absorber. The second adjustment wheel 20 can be connected in a torque-proof fashion to an adjustment rod, wherein the adjustment rod extends through the adjustment tube.

By means of a relative movement between the adjustment wheels 10, 20, a passage cross-section of a passage opening for a hydraulic medium is changed, whereby the damper characteristics of the shock absorber are adapted.

As clearly evident in FIG. 1, the adjustment wheels 10, 20 have a push-twist connection formed on the key-lock principle. In this case, the first adjustment wheel 10 comprises a passage opening 12 on which three recesses 11a, 11b, 11c are arranged. The recesses 11a, 11b, 11b each have a different size. In particular, the first recess 11a is larger than the second recess 11b and the third recess 11c. It is also evident that the first recess 11a has a different geometric shape from that of the second and third recesses 11b, 11c. In general, for all exemplary embodiments of the invention, the recesses may differ from each other not only in their size but also in their geometric form. The same applies to the complementary protrusions of the second adjustment wheel 20, which will be described in more detail below.

It is also evident from FIG. 1 that the recesses 11a, 11b, 11c are arranged on a common circle line, wherein the distance between the recesses 11a, 11b, 11c along the circle line varies. Thus the first recess 11a has a greater direct distance from the third recess 11c than from the second recess 11b.

The second adjustment wheel 20 comprises protrusions 21a, 21b, 21c formed so as to be complementary to the recesses 11a, 11b, 11c of the first adjustment wheel 10. In particular, in the exemplary embodiment shown, a first protrusion 21a is provided, the size, geometric form and position of which correspond to the size, geometric form and position of the first recess 11a of the first adjustment wheel 10. Accordingly, the size, geometric form and position of the second and third protrusions 21b, 21c are complementary to the size, form and position of the second and third recesses 11b, 11c.

It is clear from the depiction in FIG. 1 that the protrusions 21a, 21b, 21c can only extend through the recesses 11a, 11b, 11c in a single predefined relative twist position between the first adjustment wheel 10 and the second adjustment wheel 20. This relative orientation to each other is shown in FIG. 1. As soon however as one of the two adjustment wheels 10, 20 is twisted, it is no longer possible to join or separate the adjustment wheels 10, 20.

Figure 2:
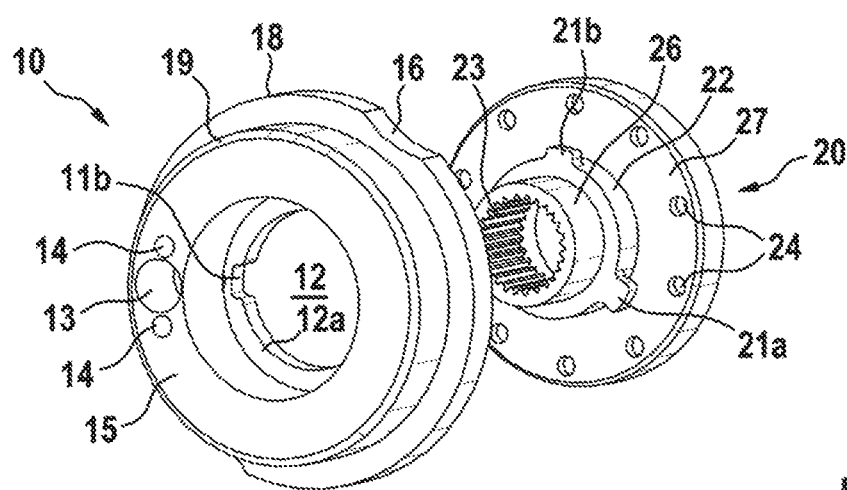
FIG. 2 is a perspective view of the adjustment wheel arrangement from FIG. 1 in a dismantled state.

FIG. 2 shows in a perspective view the configuration of the adjustment wheel arrangement. It is evident that the first adjustment wheel 10 is formed substantially annular and has a peripheral flange 18 on the side facing the second adjustment wheel 20. The peripheral flange 18 extends substantially in the plane of the passage opening 12 which comprises the recesses 11a, 11b, 11c. Also, two grip recesses 16, which can be used for manual actuation of the first adjustment wheel 10, are formed on the peripheral flange 18.

Furthermore, the first adjustment wheel 10 comprises a retaining ring 15 which can engage in an adjustment tube of a shock absorber and be fixed there by force fit and/or form fit. The retaining ring 15 has a peripheral chamfer 19 for simple insertion in the adjustment tube.

A ball seat 13 extends through the retaining ring 15. The ball seat 13 may receive a spring-loaded ball 17. Two passage holes 14 are provided adjacent to the ball seat 13. The passage holes 14 are spaced apart from each other, wherein the ball seat 13 is situated between the two passage holes 14. The function of the ball seat 13 and the passage holes 14 will be described later.

The second adjustment wheel 20 comprises a grip plate 27. The grip plate 27 may be provided with knurling around its outer periphery so that the grip plate 27 can be gripped well manually. A cylindrical fixing portion 22 which carries protrusions 21a, 21b, 21c adjoins the grip plate 27.

In this case, the protrusions 21a, 21b, 21c extend radially outward beyond the outer periphery of the fixing portion 22. The outer periphery of the fixing portion 22 substantially corresponds to the cross-sectional diameter of the passage opening 12 of the first adjustment wheel 10, so that the fixing portion 22 may extend through the passage opening 12.

The fixing portion 22 also comprises a cylindrical extension in which an internal toothing 23 is arranged. The cylindrical extension 26 has an outer diameter which is smaller than the outer diameter of the fixing portion 22. The entire fixing portion 22 with the extension 26 preferably has an axial height which corresponds at most to the axial height of the first adjustment wheel 10. In other words, when the two adjustment wheels 10, 20 are connected, the extension 26 preferably does not protrude beyond the retaining ring 15 of the first adjustment wheel 10.

As clearly evident from FIG. 2, the grip plate 27 of the second adjustment wheel 20 comprises several latching depressions 24 on a side facing the fixing portion 22. The latching depressions 24 are arranged at regular intervals from each other on a common circle line. The common circle line is concentric to the fixing portion 22. In particular, the latching depressions 24 are arranged on a common circle line with the ball seat 13 of the first adjustment wheel 10. In other words, a virtual circle on which the latching depressions 24 are arranged has the same cross-sectional diameter as a virtual circle which extends concentrically around the passage openings 12 of the first adjustment wheel 10, and on the circle line of which the ball seat 13 is arranged.

In FIG. 2, because of the overlap by the first adjustment wheel 10, the alignment pin receiver 25 of the second adjustment wheel 20—which is clearly visible in FIG. 1—cannot be seen. In this case, an alignment pin receiver 25 is provided on the same circle line as that on which the latching depressions 24 are arranged. The alignment pin receiver 25 extends completely through the grip plate 27 and has a circular cross-section. The alignment pin receiver 25 serves to receive an alignment pin which preferably protrudes beyond the grip plate 27 in the direction of the fixing portion 27.

Figure 3:
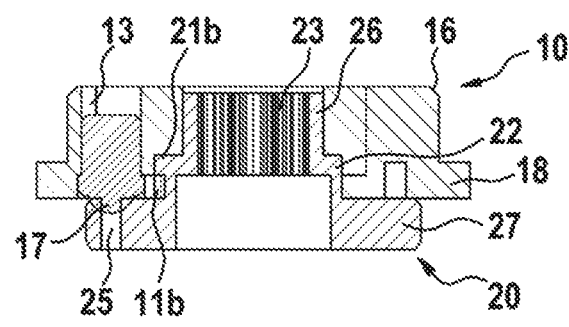
FIG. 3 is a cross-sectional view of the adjustment wheel arrangement according to FIG. 1 in the assembled state.

FIG. 3 shows a cross-section through the adjustment wheel arrangement in mounted state. It is evident that the fixing portion 22 with the extension 26 engages in the first adjustment wheel 10. In this way, a compact construction of the adjustment wheel arrangement is possible. It is also evident that the fixing portion 22, in particular the extension 26, has an internal toothing 23. The cross-section shown runs through the alignment pin receiver 25 of the second adjustment wheel 20.

A spring-loaded ball 17 is arranged in the ball seat 13 of the first adjustment wheel 10. The spring-loaded ball 17 is formed by an assembly which has a housing with an internal spring which acts on the ball. The ball protrudes beyond the peripheral flange 18 of the first adjustment wheel 10 in the longitudinal direction, and thus engages in the individual latching depressions 24 of the second adjustment wheel 20. On a twist of the adjustment wheels 10, 20 relative to each other, a clicking noise is thus produced which offers the user an acoustic feedback on the current adjustment degree of the damper setting.

It is also clear from FIG. 3 that the second adjustment wheel 20 has different inner diameters. In particular, in the region of the extension 26, a smaller inner diameter is provided than in the region of the grip plate 27.

FIG. 3 also shows the third recess 11c, wherein the third protrusion 21c has penetrated through the third recess 11c and is arranged substantially behind the passage opening 12 or behind an inner flange 12a delimiting the passage opening 12. It is clear that by twisting the second adjustment wheel 20 relative to the first adjustment wheel 10, the third protrusion 21c moves out of alignment with the third recess 11c, and thus the adjustment wheels 10, 20 are axially connected together on the principle of a bayonet closure. However, a degree of twistability remains. To this extent, the adjustment wheels 10, 20 can be twisted relative to each other but are coupled together axially by form fit.

To prevent an unintentional dismantling of the adjustment wheel arrangement, it is provided that an alignment pin is inserted in the alignment pin receiver 25. On mounting the adjustment wheel arrangement, firstly the first adjustment wheel 10 is connected to the second adjustment wheel 20, in that the recesses 11a, 11b, 11c and the protrusions 21a, 21b, 21c are aligned so as to be congruent with each other. Then the adjustment wheels 10, 20 are guided into each other axially and, by twisting the adjustment wheels 10, 20, the protrusions 21a, 21b, 21c are moved out of alignment with the recesses 11a, 11b, 11c. The protrusions 21a, 21b, 21c thus engage behind an inner flange 12a delimiting the passage opening 12, whereby an axial fixing is achieved.

In the next step, an alignment pin may now be inserted in the alignment pin receiver 25. The alignment pin is positioned preferably such that it protrudes beyond the grip plate 27 in the direction of the first adjustment wheel 10. The alignment pin receiver 25 is preferably arranged coaxially to the ball seat 13 when the protrusions 21a, 21b, 21c are oriented so as to be congruent with the receivers 11a, 11b, 11c. With prior insertion of the alignment pin in the alignment pin receiver, this causes the alignment pin to stop against the spring-loaded ball 17, inserted in the ball seat 13, when the adjustment wheels 10, 20 are twisted relative to each other.

The alignment pin thus forms a stop which delimits the maximum possible rotation angle between the adjustment wheels 10, 20. In this way, the inserted alignment pin prevents the adjustment wheels 10, 20 from assuming a relative position to each other in which the protrusions 21a, 21b, 21c align with the recesses 11a, 11b, 11c. Separation of the adjustment wheels 10, 20 from each other is thus no longer possible without destruction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An adjustment wheel arrangement for a shock absorber, comprising:
    a first adjustment wheel which is configured to connect in a torque-proof fashion to an adjustment tube of a piston rod of the shock absorber, and
    a second adjustment wheel which is configured to connect in a torque-proof fashion to an adjustment rod extending through the adjustment tube,
    wherein the first adjustment wheel and the second adjustment wheel are twistable relative to each other by a push-twist connection and are configured to be connected by form-fit to each other in the axial direction, wherein the push-twist connection is configured as a key-lock, such that the first adjustment wheel and the second adjustment wheel can be connected to or separated from each other only in a single relative orientation,
    wherein a spring-loaded ball is inserted in the first adjustment wheel and cooperates with several latching depressions in the second adjustment wheel to produce a rotational adjustment click.

2. The adjustment wheel arrangement of claim 1, wherein the push-twist connection has at least two recesses of different sizes on the first adjustment wheel and two protrusions of different complementary sizes on the second adjustment wheel, which protrusions are configured to extend through the recesses in order to connect the adjustment wheels.

3. The adjustment wheel arrangement of claim 2, wherein the recesses and the protrusions are arranged on a common circular path, wherein the spacings of the recesses of the first adjustment wheel along the circular path are different from each other, wherein the spacings of the protrusions of the second adjustment wheel along the circular path are different from each other.

4. The adjustment wheel arrangement of claim 1, wherein the first adjustment wheel has a passage opening which comprises recesses.

5. The adjustment wheel arrangement of claim 4, wherein the second adjustment wheel has a cylindrical fixing portion which extends through the passage opening of the first adjustment wheel.

6. The adjustment wheel arrangement of claim 5, wherein protrusions are formed on the cylindrical fixing portion.

7. The adjustment wheel arrangement of claim 1, wherein the second adjustment wheel has at least one internal toothing for force-fit and/or form-fit connection to the adjustment rod.

8. The adjustment wheel arrangement of claim 7 wherein a cylindrical fixing portion of the second adjustment wheel has the at least one internal toothing for force-fit and/or form-fit connection to the adjustment rod.

9. The adjustment wheel arrangement of claim 1, wherein the second adjustment wheel has an alignment pin receiver arranged on a common circular path with the latching depressions.

10. The adjustment wheel arrangement of claim 9, wherein an alignment pin is inserted in the alignment pin receiver.

11. An adjustment wheel arrangement for a shock absorber, the adjustment wheel arrangement comprising:
- a first adjustment wheel which is configured to connect in a torque-proof fashion to an adjustment tube of a piston rod of the shock absorber, and
- a second adjustment wheel which is configured to connect in a torque-proof fashion to an adjustment rod extending through the adjustment tube,
- wherein the first adjustment wheel and the second adjustment wheel are twistable relative to each other by a push-twist connection and are configured to be connected by form-fit to each other in the axial direction, wherein the push-twist connection is configured as a key-lock, such that the first adjustment wheel and the second adjustment wheel can be connected to or separated from each other only in a single relative orientation,
- wherein a spring-loaded ball is inserted in the first adjustment wheel and cooperates with several latching depressions in the second adjustment wheel to produce a rotational adjustment click,
- wherein the second adjustment wheel has an alignment pin receiver arranged on a common circular path with the latching depressions,
- wherein the alignment pin receiver is positioned such that the alignment pin receiver aligns with the spring-loaded ball when the first adjustment wheel and the second adjustment wheel have a relative position to each other in which recesses and protrusions of the push-twist connection are arranged above each other so as to be congruent.

12. An adjustment wheel arrangement for a shock absorber, the adjustment wheel arrangement comprising:
- a first adjustment wheel which is configured to connect in a torque-proof fashion to an adjustment tube of a piston rod of the shock absorber, and
- a second adjustment wheel which is configured to connect in a torque-proof fashion to an adjustment rod extending through the adjustment tube,
- wherein the first adjustment wheel and the second adjustment wheel are twistable relative to each other by a push-twist connection and are configured to be connected by form-fit to each other in the axial direction, wherein the push-twist connection is configured as a key-lock, such that the first adjustment wheel and the second adjustment wheel can be connected to or separated from each other only in a single relative orientation,
- wherein a spring-loaded ball is inserted in the first adjustment wheel and cooperates with several latching depressions in the second adjustment wheel to produce a rotational adjustment click,
- wherein the second adjustment wheel has an alignment pin receiver arranged on a common circular path with the latching depressions,
- wherein for visual inspection of the relative position between the adjustment wheels, the first adjustment wheel has two passage holes, between which the spring-loaded ball is inserted, wherein said passage holes align with the alignment pin receiver in two predefined twist positions.

* * * * *